(12) United States Patent
Ogino

(10) Patent No.: US 9,977,319 B2
(45) Date of Patent: May 22, 2018

(54) LIGHT SOURCE DEVICE WITH LIGHT SPLITTING MIRROR AND REFLECTION MIRROR FOR REDUCING INFLUENCE ON UNIFORMITY OF INTENSITY DISTRIBUTION OF BEAM FLUX, AND PROJECTION DEVICE

(71) Applicant: CASIO COMPUTER CO., LTD., Tokyo (JP)

(72) Inventor: Hiroshi Ogino, Higashimurayama (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days. days.

(21) Appl. No.: 15/281,403

(22) Filed: Sep. 30, 2016

(65) Prior Publication Data

US 2017/0176845 A1    Jun. 22, 2017

(30) Foreign Application Priority Data

Dec. 18, 2015  (JP) .................................. 2015-247667
Feb. 22, 2016  (JP) .................................. 2016-030559

(51) Int. Cl.
*G03B 21/20* (2006.01)
*F21V 7/05* (2006.01)
(Continued)

(52) U.S. Cl.
CPC ............ *G03B 21/2066* (2013.01); *F21V 7/05* (2013.01); *F21V 29/67* (2015.01); *F21V 29/70* (2015.01);
(Continued)

(58) Field of Classification Search
CPC . F21V 29/67; F21V 29/70; F21V 7/05; G02B 27/14; G03B 21/204; G03B 21/206; G03B 21/2066; F21Y 2115/30
See application file for complete search history.

(56) References Cited

U.S. PATENT DOCUMENTS 5,946,054 A * 8/1999 Sannohe .............. H04N 9/3167
                                                       348/745
2005/0117337 A1   6/2005 Ishii et al.
(Continued)

FOREIGN PATENT DOCUMENTS

JP       2005-164769 A    6/2005
JP       2009-031715 A    2/2009
(Continued)

OTHER PUBLICATIONS

Notification of Reasons for Refusal dated Mar. 15, 2018 received in Japanese Patent Application No. JP 2016-030559 together with an English language translation.

*Primary Examiner* — Sultan Chowdhury
*Assistant Examiner* — Magda Cruz
(74) *Attorney, Agent, or Firm* — Scully, Scott, Murphy & Presser, P.C.

(57) ABSTRACT

A light source device includes a plurality of first solid-state light emitting elements configured to emit first beams. a light splitting mirror provided in correspondence to the first solid-state light emitting elements and configured to split the first beams, which are incident from a first direction, by penetration and reflection, and a reflection mirror provided in correspondence to the light splitting mirror and configured to reflect one first beams split at the light splitting mirror in the same direction as the other first beams split at the light splitting mirror.

19 Claims, 9 Drawing Sheets

(51) Int. Cl.
    *G02B 27/14*      (2006.01)
    *F21V 29/70*      (2015.01)
    *F21V 29/67*      (2015.01)
    *F21Y 115/30*     (2016.01)
(52) U.S. Cl.
    CPC ........... *G02B 27/14* (2013.01); *G03B 21/204* (2013.01); *G03B 21/206* (2013.01); *F21Y 2115/30* (2016.08)

(56) References Cited

U.S. PATENT DOCUMENTS

| | | | |
|---|---|---|---|
| 2009/0262309 A1 | 10/2009 | Yamauchi | |
| 2010/0328633 A1* | 12/2010 | Sato | G02B 27/1033 353/99 |
| 2011/0292349 A1* | 12/2011 | Kitano | G03B 21/20 353/31 |
| 2012/0133903 A1 | 5/2012 | Tanaka | |
| 2015/0029467 A1 | 1/2015 | Sugiyama et al. | |
| 2016/0334695 A1 | 11/2016 | Yamada et al. | |

FOREIGN PATENT DOCUMENTS

| | | |
|---|---|---|
| JP | 2011-203430 A | 10/2011 |
| JP | 2012-079622 A | 4/2012 |
| JP | 2012-133337 A | 7/2012 |
| JP | 2015-025832 A | 2/2015 |
| JP | 2015-038618 A | 2/2015 |
| WO | 2015/129656 A1 | 9/2015 |

* cited by examiner

LIGHT SOURCE DEVICE WITH LIGHT SPLITTING MIRROR AND REFLECTION MIRROR FOR REDUCING INFLUENCE ON UNIFORMITY OF INTENSITY DISTRIBUTION OF BEAM FLUX, AND PROJECTION DEVICE

CROSS-REFERENCE TO RELATED APPLICATION

This application is based upon and claims the benefit of priorities from the prior Japanese Patent Application No. 2015-247667 filed on Dec. 18, 2015 and Japanese Patent Application No. 2016-030559 filed on Feb. 22, 2016, and the entire contents of which are incorporated herein by reference.

BACKGROUND

1. Technical Field

The invention relates to a light source device and a projection device having the light source device.

2. Description of Related Art

In recent years, a data projector serving as an imaging device configured to project a screen of a personal computer or a video screen, or an image and the like based on image data stored in a memory card and the like, onto a screen has been used. The projector is configured to condense lights emitted from a light source to a micro mirror display element referred to as DMD (digital micro mirror device) or a liquid crystal plate and to thereby display a color image on the screen.

In the projector, a high-luminance discharge lamp has been mainly used as the light source. However, in recent years, a variety of projectors using, as the light source, a light emitting diode, a laser diode, an organic EL, a fluorescent member or the like have been developed.

For example, a Japanese Patent Application Publication No. 2015-38618A discloses a light emitting unit capable of uniformizing diffusion light and a projector including the light emitting unit and capable of generating a projection image having less uneven illuminance. The light emitting unit has blue light sources that are laser light emitters configured to emit light of a blue wavelength band and are arranged in a matrix shape. The blue wavelength band light emitted from each blue light source is reflected toward a condensing lens by a plurality of reflection mirrors arranged in a step shape. The reflection mirrors are configured to narrow gaps between beams emitted from the respective blue light sources, thereby reducing a sectional area of the emitted beam flux in a horizontal direction of the projector.

The projection device including the light sources as described in Japanese Patent Application Publication No. 2015-38618A is configured to synthesize laser lights emitted from the plurality of light sources so as to secure sufficient brightness. Also, since an output per one light source configured to emit the laser recently tends to increase, the respective light sources are preferably mounted with being sufficiently spaced for cooling. However, when the respective light sources are disposed with being spaced, an intensity distribution of lights in the beam flux formed by the emission lights becomes discrete, so that it is difficult to implement illumination of a uniform intensity distribution.

SUMMARY OF THE INVENTION

The invention has been made in view of the above situations, and an object of the invention is to provide a light source device configured to emit lights of a uniform intensity distribution and a projection device using the light source device.

A light source device according to an exemplary embodiment of the invention comprises:
a plurality of first solid-state light emitting elements configured to emit first beams;
a light splitting mirror provided in correspondence to the first solid-state light emitting elements and configured to split the first beams, which are incident from a first direction, by penetration and reflection; and
a reflection mirror provided in correspondence to the light splitting mirror and configured to reflect one first beams split at the light splitting mirror in the same direction as the other first beams split at the light splitting mirror.

A projection device according to an exemplary embodiment of the invention comprises:
the light source device;
a display element configured to generate image light;
a projection-side optical system configured to project the image light emitted from the display element onto a screen; and
a projection device control unit configured to control the light source device and the display element.

DETAILED DESCRIPTION OF THE PREFERRED EMBODIMENT

First Exemplary Embodiment

Figure 1:
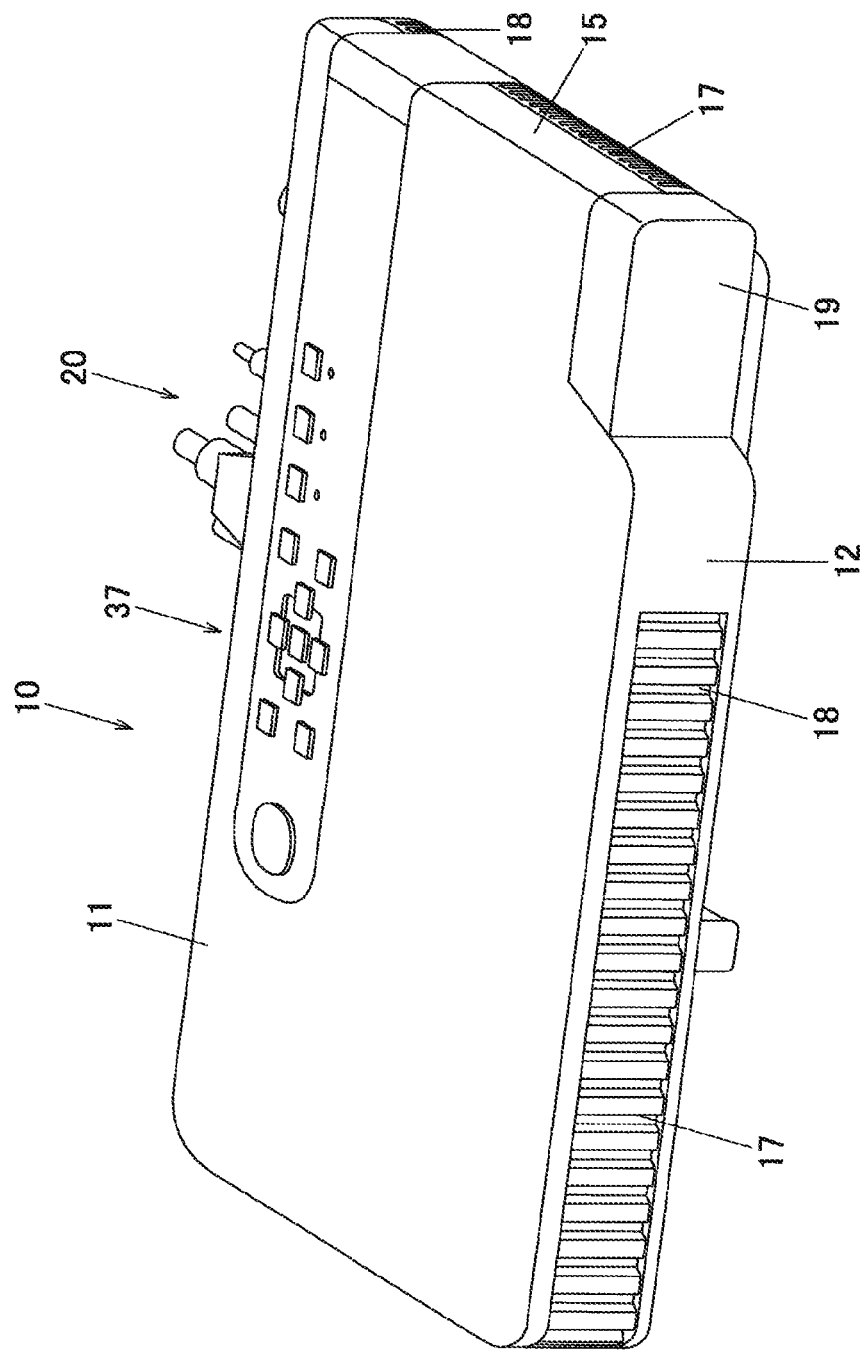
FIG. 1 is an external perspective view depicting a projection device in accordance with a first exemplary embodiment of the invention.

Hereinafter, exemplary embodiments of the invention will be described. FIG. 1 is an external perspective view depicting a projection device 10 in accordance with a first exemplary embodiment. In the first exemplary embodiment, the left and right of the projection device 10 indicates a left-right direction with respect to a projection direction, and the front and rear indicates a front-rear direction with respect to a screen-side direction of the projection device 10 and a traveling direction of a beam flux.

As shown in FIG. 1, the projection device 10 has a substantially cuboid shape, and includes a lens cover 19 configured to cover a projection port and provided at a side of a front panel 12 becoming a front side panel of a projection device housing. The front panel 12 is provided with a plurality of intake holes 18 and exhaust holes 17. Also, although not shown, the projection device has an Ir reception unit configured to receive a control signal from a remote controller.

Also, an upper panel 11 of the housing is provided with a key/indicator unit 37. The key/indicator unit 37 includes keys and indicators such as a power indicator configured to notify an on or off state of a power supply switch key or a power supply, a projection switch key configured to switch on and off states of projection, an overheating indicator configured to notify an overheated state of a light source unit, a display element, a control circuit or the like, and the like Also, a backside panel of a rear part of the housing is provided with a variety of terminals 20 such as an input/output connector unit having a USB terminal, a D-SUB terminal for image signal input, an S terminal, an RCA terminal and the like, a power supply adaptor and the like. Also, the backside panel is formed with a plurality of intake holes. In the meantime, a right panel (not shown), which is a side plate of the housing, and a left panel 15, which is a side plate shown in FIG. 1, are respectively formed with a plurality of exhaust holes 17. Also, a corner portion of the left panel 15 in the vicinity of the backside panel is formed with intake holes 18, too.

Figure 2:
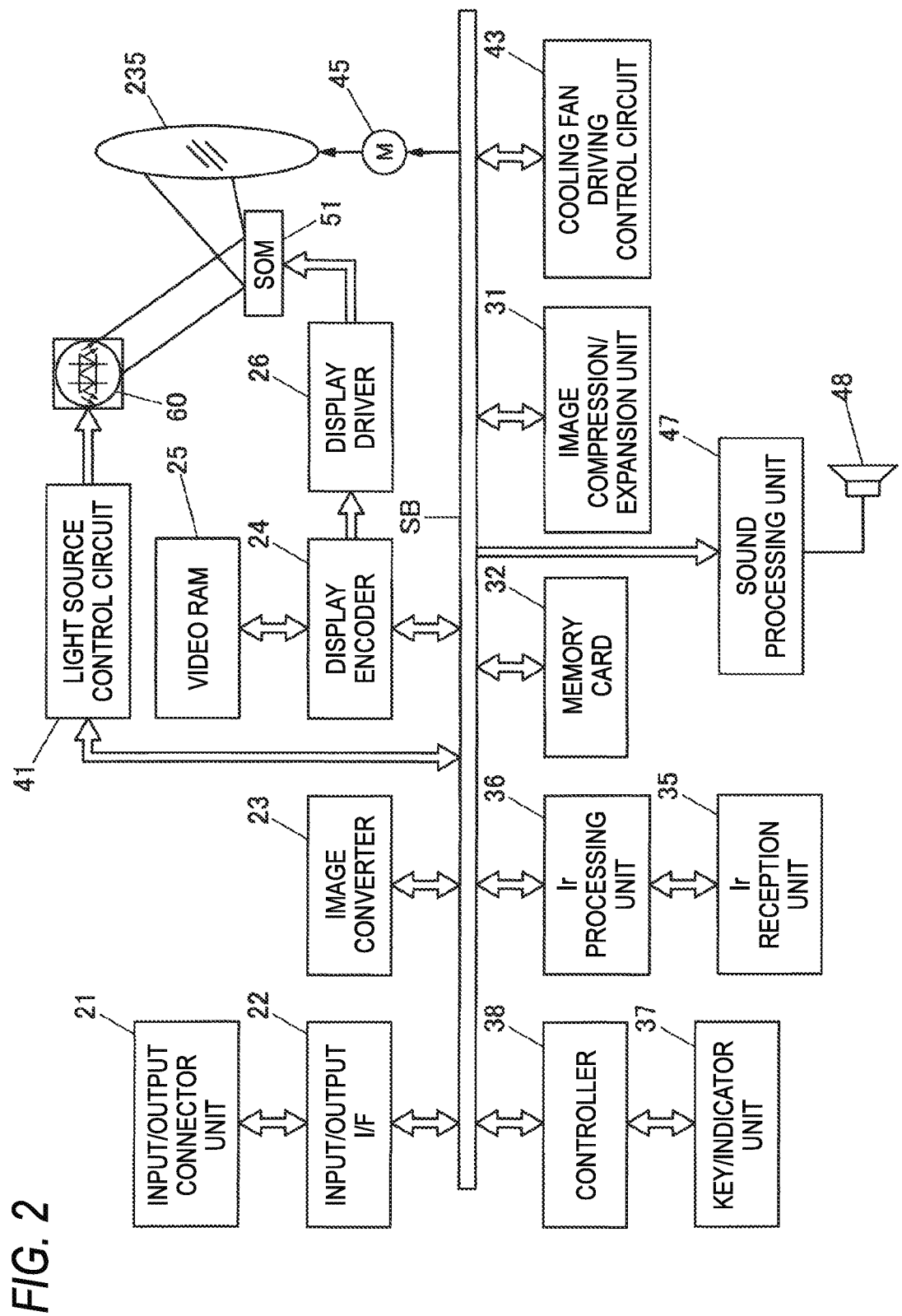
FIG. 2 is a functional circuit block diagram of the projection device in accordance with the first exemplary embodiment of the invention.

Subsequently, a projection device control unit of the projection device 10 is described with reference to a functional circuit block diagram of FIG. 2. The projection device control unit is configured by a controller 38, an input/output interface 22, an image converter 23, a display encoder 24, a display driver 26, and the like. A variety of image signals input from the input/output connector unit 21 are converted into image signals having a predetermined format, which is appropriate for display, in the image converter 23 via the input/output interface 22 and a system bus (SB), which are then output to the display encoder 24.

Also, the display encoder 24 is configured to develop and store the input image signal into a video RAM 25, to generate a video signal from stored contents of the video RAM 25 and to output the video signal to the display driver 26.

The display driver 26 is configured to function as a display element control unit. The display driver 26 is configured to drive a display element 51, which is a spatial light modulation element (SOM), at an appropriate frame rate, in correspondence to the image signal output from the display encoder 24. The projection device 10 is configured to form an optical image by reflection light of the display element 51 by illuminating a beam flux, which is to be emitted from a light source device 60, to the display element 51 via a light guide optical system, and to project and display an image on a screen (not shown) via a projection-side optical system (not shown). In the meantime, a moveable lens group 235 of the projection-side optical system is driven for zoom adjustment or focus adjustment by a lens motor 45.

Also, an image compression/expansion unit 31 is configured to perform recording processing of data-compressing a brightness signal and a color difference signal of the image signal by processing such as ADCT and Huffman encoding and sequentially writing the same to a memory card 32, which is a freely detachable recording medium. Also, in a reproduction mode, the image compression/expansion unit 31 is configured to perform processing of reading out the image data recorded in the memory card 32, expanding each image data configuring a series of moving pictures in one frame unit, outputting the image data to the display encoder 24 via the image converter 23, and displaying a moving picture and the like on the basis of the image data stored in the memory card 32.

The controller 38 is configured to control operations of respective circuits in the projection device 10, and includes a CPU, a ROM in which operating programs such as diverse settings are fixedly stored, a RAM configured to be used as a work memory, and the like.

An operation signal of the key/indicator unit 37 configured by a main key, an indicator and the like provided on the upper panel 11 of the housing is directly transmitted to the controller 38. A key operation signal from the remote controller is received at an Ir reception unit 35, and a code signal decoded in an Ir processing unit 36 is output to the controller 38.

The controller 38 is connected with a sound processing unit 47 via the system bus (SB). The sound processing unit 47 has a sound source circuit such as a PCM sound source, and is configured to convert sound data into analog data, to drive a speaker 48 and to amplify and output the sound in projection and reproduction modes.

Also, the controller 38 is configured to control a light source control circuit 41 serving as a light source control unit. The light source control circuit 41 is configured to individually control operations of an excitation light illumination device of the light source device 60 so that light of a predetermined wavelength band necessary for image generation is to be emitted from the light source device 60. Also, the light source control circuit 41 is configured to control synchronization timing of a fluorescent wheel in accordance with the projection mode, based on an instruction from the controller 38.

Also, the controller 38 is configured to enable a cooling fan driving control circuit 43 to detect temperatures by a plurality of temperature sensors provided for the light source device 60 and the like, and also to control a rotating speed of a cooling fan on the basis of a result of the temperature detection. Also, the controller 38 is configured to perform control of enabling the cooling fan driving control circuit 43 to continuously rotate the cooling fan even at an off state of a power supply of a projection device main body by a timer or the like, or to configured to perform control of turning off the power supply of the projection device main body in accordance with the result of the temperature detection by the temperature sensors.

Figure 3:
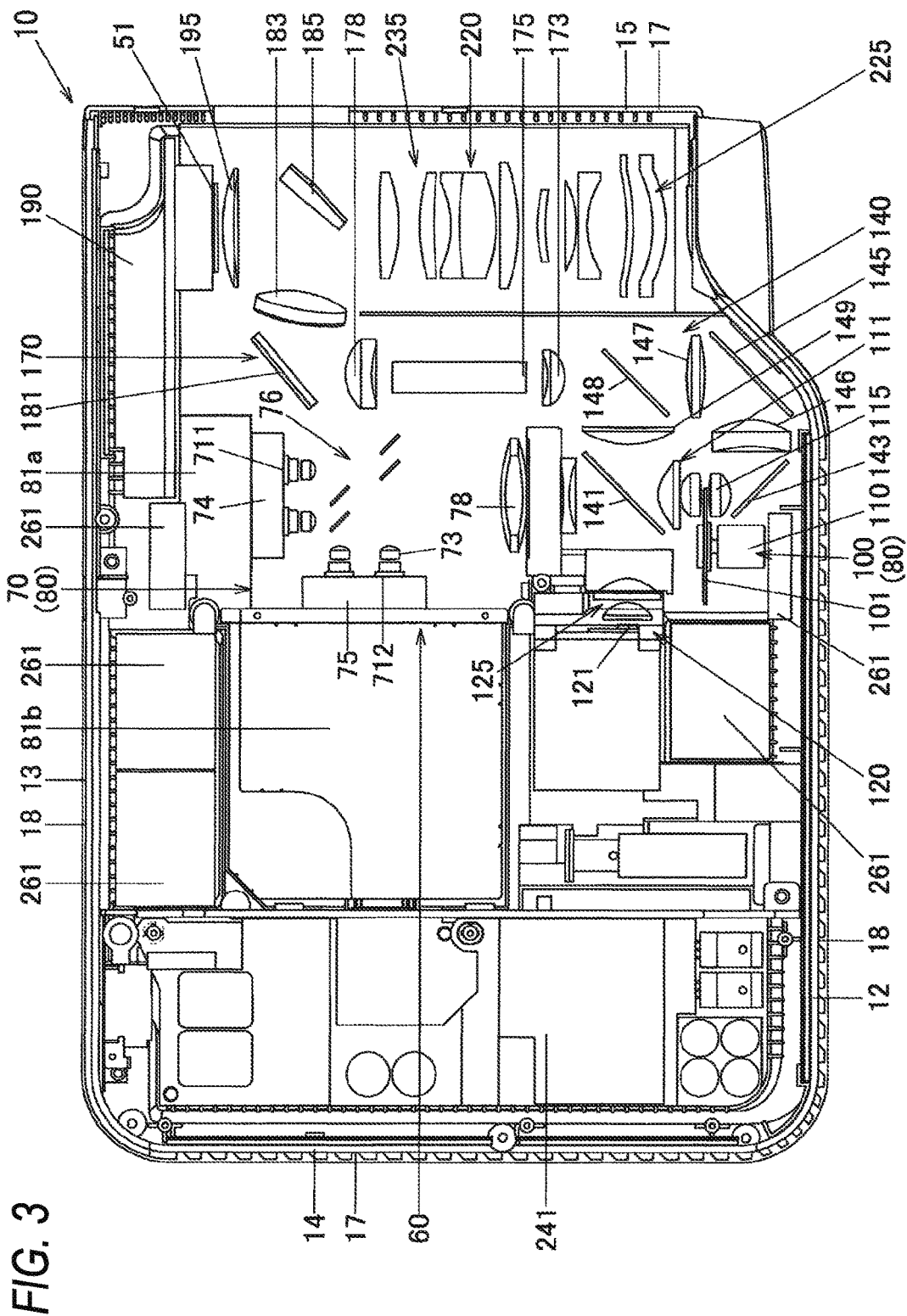
FIG. 3 is a plan view depicting an internal structure of the projection device in accordance with the first exemplary embodiment of the invention.

FIG. 3 is a plan view depicting an internal structure of the projection device 10. The projection device 10 has a control circuit board 241 in the vicinity of a right panel 14. The control circuit board 241 has a power supply circuit block, a light source control block, and the like. Also, the projection device 10 has the light source device 60 at a side of the control circuit board 241, i.e., at a substantially central part of the housing of the projection device 10. Also, a light source-side optical system 170 and a projection-side optical system 220 are disposed between the light source device 60 and the left panel 15.

The light source device 60 has an excitation light illumination device (light source device) 70, which is a light source of blue wavelength band light, a green light source device 80, which is a light source of green wavelength band light, and a red light source device 120, which is a light source of red wavelength band light. The green light source device 80 is configured by the excitation light illumination device 70 and a fluorescent wheel device 100. In the light source device 60, a light guide optical system 140 configured to guide each color wavelength band light is disposed. The light guide optical system 140 is configured to condense each color wavelength band light, which is to be emitted from each color light source device 60, to an incidence port of a light tunnel 175.

The excitation light illumination device 70 is disposed in the vicinity of the backside panel 13 in the front-rear direction at a substantially central part of the housing of the projection device 10 in the left-right direction. The excitation light illumination device 70 has a first light source unit 74 and a second light source unit 75 having a light source group consisting of first blue laser diodes (first solid-state light emitting elements) 711 and second blue laser diodes (second solid-state light emitting elements) 712, which are solid-state light emitting elements. A wavelength band of the first blue laser diode (first solid-state light emitting element) 711 and a wavelength band of the second blue laser diode (second solid-state light emitting element) 712 may be the same or different from each other. For example, the wavelength band of the second blue laser diode (second solid-state light emitting element) 712 may be set to a shorter wavelength than the wavelength band of the first blue laser diode (first solid-state light emitting element) 711. Also, the excitation light illumination device 70 has a mirror group 76 configured to guide optical axes of emission lights from the respective blue laser diodes 711, 712 toward the front panel 12, a condensing lens 78 configured to condense the emission lights from the mirror group 76, and the like. The first light source unit 74 has a heat sink 81a between the first light source unit and the backside panel 13, and the second light source unit 75 has a heat sink 81b between the second light source unit and the right panel 14.

Cooling fans 261 are respectively disposed between the respective heat sinks 81a, 81b and the backside panel 13. By the cooling fans 261 and the respective heat sinks 81a, 81b, the respective blue laser diodes 711, 712 are cooled. Also, a cooling fan (not shown) is disposed at the rear of the mirror group 76, too. By this cooling fan, the mirror group 76 is cooled.

The first light source unit 74 and the second light source unit 75 are configured to emit blue wavelength band lights by the respective blue laser diodes 711, 712 provided for each of the light source units. The blue wavelength band lights emitted by the respective blue laser diodes 711, 712 are illuminated to the condensing lens 78 via the mirror group 76.

Figure 4:
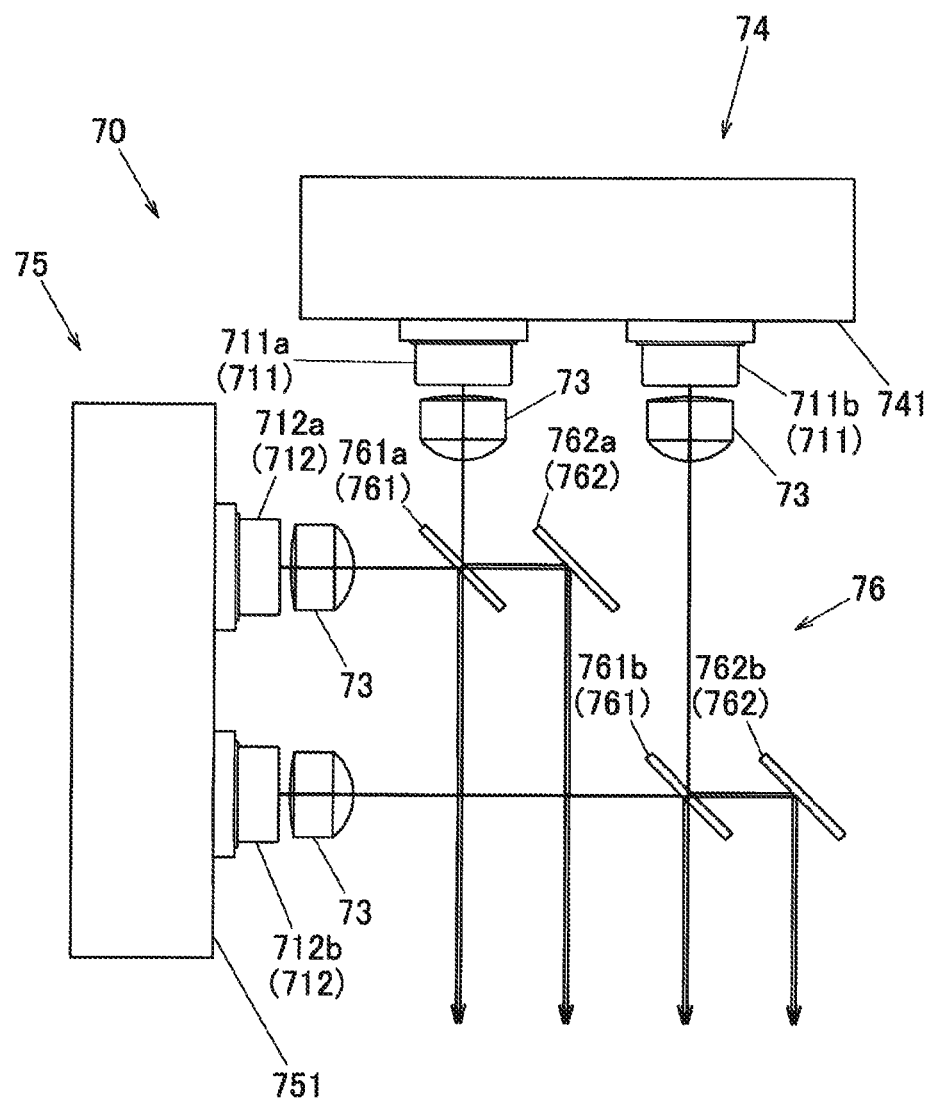
FIG. 4 is a plan view depicting a configuration of an excitation light illumination device in accordance with the first exemplary embodiment of the invention.
Figure 5:
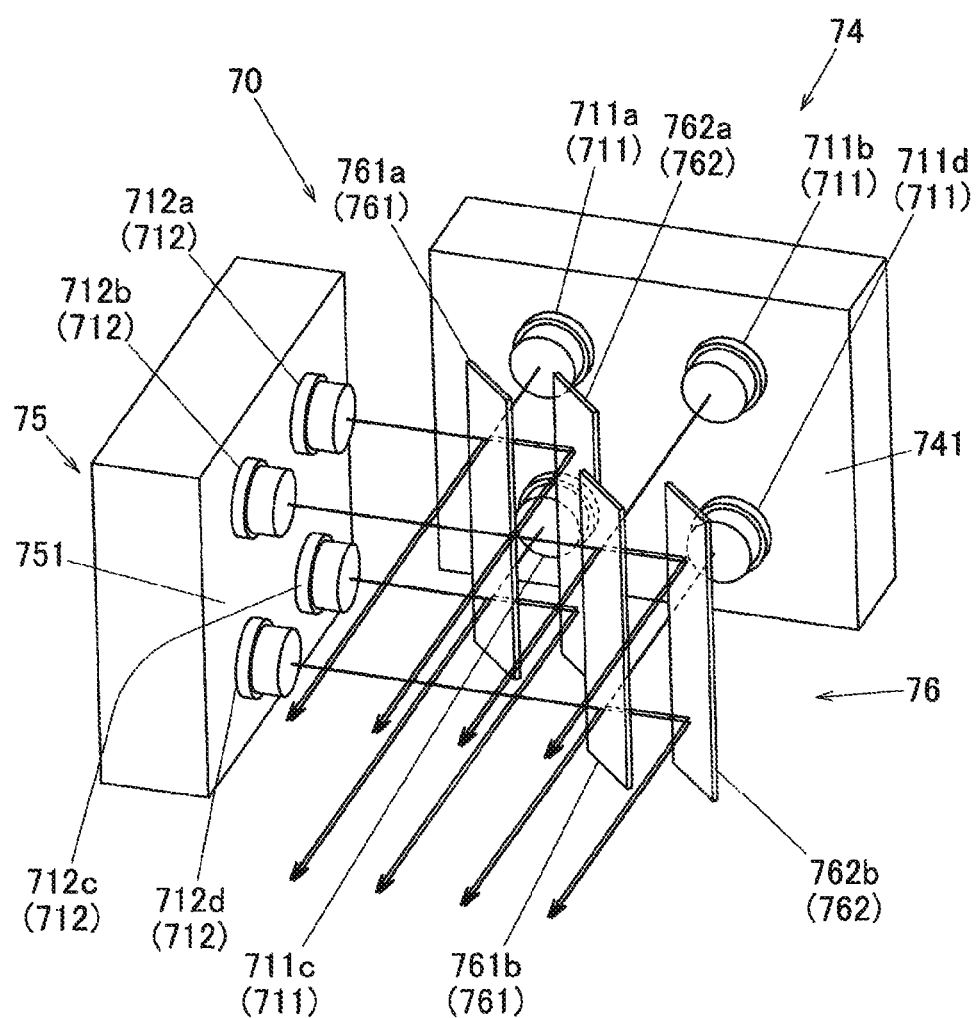
FIG. 5 is a perspective view depicting the configuration of the excitation light illumination device in accordance with the first exemplary embodiment of the invention.

Herein, the excitation light illumination device 70 is described in detail. FIG. 4 is a plan view depicting a configuration of the excitation light illumination device 70. Also, FIG. 5 is a perspective view depicting the configuration of the excitation light illumination device 70. The respective light source units 74, 75 are provided with the plurality of blue laser diodes 711, 712 disposed in a matrix shape forming rows and columns. In the first exemplary embodiment, the respective blue laser diodes 711 (711a to 711d), 712 (712a to 712d) are provided in a matrix shape of two rows and two columns on respective arrangement surfaces 741, 751 of the respective light source units 74, 75 so that four laser diodes are provided each for the respective blue laser diodes 711, 712 (refer to FIG. 5). As shown in FIG. 4, collimator lenses 73 configured to convert the emission lights into parallel lights so as to improve directionality of the emission lights are respectively disposed on front surfaces of the respective blue laser diodes 711, 712. Meanwhile, in FIG. 5, the collimator lenses 73 are not shown. The first light source unit 74 is disposed so that the arrangement surface 741 on which the first blue laser diodes 711 are disposed is perpendicular to a direction of the fluorescent wheel 101 (refer to FIG. 3) (which will be described later) that is an emission direction of the light of the excitation light illumination device 70. The second light source unit 75 is disposed so that the arrangement surface 751 on which the second blue laser diodes 712 are disposed is parallel with the direction of the fluorescent wheel 101 that is an emission direction of the light of the excitation light illumination device 70.

The excitation light illumination device 70 is configured to control the plurality of the first blue laser diodes 711 and the second blue laser diodes 712 as one group unit of the same system. That is, the excitation light illumination device 70 is configured to control a unit of one group of the first blue laser diodes 711 and the second blue laser diodes 712 for each of the first light source unit 74 and the second light source unit 75.

The mirror group 76 has a plurality of half mirrors (light splitting mirrors) 761 (761a, 761b) and a plurality of total reflection mirrors 762 (762a, 762b) corresponding to the half mirrors 761. Each of the half mirror 761 and the total reflection mirror 762 has a flat plate shape of a strip shape, as shown in FIG. 5. Each half mirror 761 and each total reflection mirror 762 are disposed so that a longitudinal direction thereof is perpendicular to an incident direction (first direction) of the blue wavelength band light emitted from the first blue laser diode 711 and an incident direction (second direction) of the blue wavelength band light emitted from the second blue laser diode 712. The half mirror 761 is a light splitting mirror configured to enable a part of the blue wavelength band light, which is a light guide target, to penetrate therethrough and to reflect the remaining blue wavelength band light. In the first exemplary embodiment, the half mirror 761 is configured to enable a substantial half of the incident blue wavelength band light to penetrate therethrough and to reflect the remaining half. The total reflection mirror 762 is a mirror configured to totally reflect the blue wavelength band light, which is a light guide target.

In a plan view of FIG. 4 as seen from the longitudinal direction of the half mirror 761, the half mirror 761 and the total reflection mirror 762 correspond to one combination of the first blue laser diodes 711 and the second blue laser diodes 712. That is, in FIGS. 4 and 5, the first blue laser diodes 711a, 711c and the second blue laser diodes 712a, 712c of one combination correspond to the half mirror 761a and the total reflection mirror 762a of one side, and the first blue laser diodes 711b, 711d and the second blue laser diodes 712b, 712d of the other combination correspond to the half mirror 761b and the total reflection mirror 762b of the other side. Meanwhile, in FIG. 5, the half mirror 761a and the total reflection mirror 762a correspond to the combination of the first blue laser diode 711a and the second blue laser diode 712a disposed at the upper side in the row direction and the combination of the first blue laser diode 711c and the second blue laser diode 712c disposed at the lower side in the row direction. However, the half mirror 761a and the total reflection mirror 762a may be configured as members divided into upper and lower sides and made to correspond to each of the combinations. The other half mirror 761b and total reflection mirror 762b may also be configured as members divided into upper and lower sides.

Also, the half mirrors 761a, 761b and the total reflection mirrors 762a, 762b may be integrally provided for one base member.

The half mirror 761 and the total reflection mirror 762 are respectively disposed so that incident angles of the blue wavelength band lights incident from the first blue laser diode 711 and the second blue laser diode 712 are 45°. Also, in the first exemplary embodiment, the blue wavelength band light emitted from the first blue laser diode 711 and the blue wavelength band light emitted from the second blue laser diode 712 of the lights incident on the half mirror 761 intersect at an angle of 90° at the position of the half mirror 761.

Subsequently, a light path of each emission light is described. The blue wavelength band lights emitted from the first blue laser diodes 711a, 711c penetrate by half the half mirror 761a, which are then emitted toward the direction of the fluorescent wheel 101, and the remaining halves thereof are reflected toward the total reflection mirror 762a. The blue wavelength band lights reflected on the half mirror 761a are then reflected on the total reflection mirror 762a and are emitted toward the direction of the fluorescent wheel 101.

The blue wavelength band lights emitted from the second blue laser diodes 712a, 712c are reflected by half toward the direction of the fluorescent wheel 101 by the half mirror 761a, and the remaining halves penetrate the half mirror 761a and are then emitted toward the total reflection mirror 762a. The blue wavelength band lights having penetrated the half mirror 761a are then reflected on the total reflection mirror 762a and are emitted toward the direction of the fluorescent wheel 101.

Likewise, the blue wavelength band lights emitted from the first blue laser diodes 711b, 711d penetrate by half the half mirror 761b, which are then emitted toward the direction of the fluorescent wheel 101, and the remaining halves thereof are reflected toward the total reflection mirror 762b. The blue wavelength band lights reflected on the half mirror 761b are then reflected on the total reflection mirror 762b and are emitted toward the direction of the fluorescent wheel 101.

The blue wavelength band lights emitted from the second blue laser diodes 712b, 712d are reflected by half toward the direction of the fluorescent wheel 101 by the half mirror 761b, and the remaining halves penetrate the half mirror 761b and are then emitted toward the total reflection mirror 762b. The blue wavelength band lights having penetrated the half mirror 761ba are then reflected on the total reflection mirror 762b and are emitted toward the direction of the fluorescent wheel 101.

As shown in FIG. 4, the respective blue laser diodes 711, 712 disposed at the respective light source units 74, 75 are disposed with being spaced from each other. The one combination of the half mirror 761a and the total reflection mirror 762a is disposed near the other combination of the half mirror 761b and the total reflection mirror 762b. Also, the one combination is disposed with a shift from the light paths of the blue wavelength band lights incident on the other combination and the light paths of the blue wavelength band lights emitted from the other combination. In this way, it is possible to dispose the total reflection mirrors 762 at positions that do not overlap with the light paths of the emission lights from the first blue laser diodes 711 disposed at the one first light source unit 74-side. That is, it is possible to dispose the total reflection mirrors 762, which are optical elements, in spaces formed by disposing the blue laser diodes 711, 712 with being spaced. Therefore, as compared to a configuration where the blue wavelength band lights emitted from the plurality of combinations of the first blue laser diodes 711 and the second blue laser diodes 712 are incident on one half mirror and one total reflection mirror, it is possible to improve heat radiation and cooling effects of the respective blue laser diodes 711, 712 and to miniaturize the excitation light illumination devices 70, 90, 90A. Also, since the plurality of the first blue laser diodes 711 and the second blue laser diodes 712 are disposed with being unified for each of the light source units 74, 75, it is possible to make the space for disposing therein the respective blue laser diodes small.

As shown in FIGS. 4 and 5, the four blue wavelength band lights emitted from the first blue laser diodes 711 and the four blue wavelength band lights emitted from the second blue laser diodes 712 are split to eight blue wavelength band lights of which a light intensity is a half of the original intensity, respectively. The eight split blue wavelength band lights emitted from the first blue laser diodes 711 and the eight split blue wavelength band lights emitted from the second blue laser diodes 712 become the same optical axes, respectively, in correspondence to each other. For this reason, the blue wavelength band lights emitted from the excitation light illumination device 70 are finally emitted in the same direction toward the fluorescent wheel 101, as a total of eight beams.

In the above, the blue wavelength band lights are emitted from both the first blue laser diodes (first solid-state light emitting elements) 711 and the second blue laser diodes (second solid-state light emitting elements) 712. However, the invention is not limited thereto. For example, the lights may be emitted from the blue laser diodes (solid-state light emitting elements) of any one side. For instance, even in a configuration where the lights are emitted from only the first blue laser diodes (first solid-state light emitting elements) 711 of the first light source unit 74, since the blue light emitted from the blue laser diode 711a is split to blue light penetrating the half mirror (light splitting mirror) 761a and blue light to be reflected on the half mirror (light splitting mirror) 761a and then reflected on the total reflection mirror 762a, it is possible to double the number of beams and to emit the lights of which an intensity distribution is uniform.

Therefore, at normal times, the blue lights are emitted from both the first blue laser diodes 711 disposed at the first light source unit 74 and the second blue laser diodes 712 disposed at the second light source unit 75 are emitted, and at an eco mode, the blue lights are emitted from the blue laser diodes disposed at any one light source unit. By this configuration, it is possible to lower the power consumption, to double the number of beams and to emit the lights of which an intensity distribution is uniform. Like this, the configuration where any one light source unit is not turned on at the eco mode has a merit that the control is not complex, as compared to the control of reducing an amount of the lights, which are to be emitted from the blue laser diodes of both the light source units, by half.

Also, the wavelength band of the second blue laser diode (second solid-state light emitting element) 712 is set to a shorter wavelength than the wavelength band of the first blue laser diode (first solid-state light emitting element) 711. Thereby, when illuminating the blue lights to a fluorescent material of the fluorescent wheel 101, i.e., using the blue lights as excitation lights, the blue lights are emitted from only the second blue laser diodes (second solid-state light emitting elements) 712 close to a short wavelength, so that the fluorescence is likely to be emitted. Also, when using the blue lights as blue lights penetrating a diffusion area of the fluorescent wheel 101, the blue lights are emitted from only the first blue laser diodes (first solid-state light emitting elements) 711 close to a long wavelength, so that the blue lights having higher color purity are used.

Returning to FIG. 3, the fluorescent wheel device 100 has the fluorescent wheel 101, a motor 110 configured to rotate the fluorescent wheel 101, a condensing lens group 111, and a condensing lens 115. The fluorescent wheel 101 is disposed to be parallel with the front panel 12, i.e., to be substantially perpendicular to the optical axes of the emission lights from the excitation light illumination device 70. The condensing lens group 111 is configured to condense a beam flux of the excitation lights emitted from the excitation light illumination device 70 to the fluorescent wheel 101 and to condense a beam flux emitted from the fluorescent wheel 101 toward the backside panel 13. The condensing lens 115 is configured to condense a beam flux emitted from the fluorescent wheel 101 toward the front panel 12. A cooling fan 261 is disposed at a side of the motor 110 facing the front panel 12. By the cooling fan 261, the fluorescent wheel device 100 and the like are cooled.

The light guide optical system 140 has a condensing lens configured to condense a beam flux of the respective color wavelength bands and a reflection mirror and a dichroic mirror configured to convert an optical axis of the beam flux of the respective color wavelength bands. Specifically, as the light guide optical system 140, a first dichroic mirror 141 is disposed at a position between the condensing lens 78 and the condensing lens group 111. The first dichroic mirror 141 is configured to reflect green wavelength band light emitted from the fluorescent wheel 101, to convert an optical axis thereof in a direction of the left panel 15 by 90°, and to enable the blue wavelength band light and the red wavelength band light emitted from the excitation light illumination device 70 or the red light source device 120 to penetrate therethrough.

A condensing lens 149 is disposed at a side of the first dichroic mirror 141 facing the left panel 15. A second dichroic mirror 148 is disposed at a side of the condensing lens 149 facing the left panel 15, i.e., a side of the condensing lens 147 facing the backside panel 13. The second dichroic mirror 148 is configured to reflect the red wavelength band light and the green wavelength band light and to enable the blue wavelength band light to penetrate therethrough. The red wavelength band light having penetrated the first dichroic mirror 141 and the green wavelength band light reflected on the first dichroic mirror 141 are incident on the condensing lens 149. Then, the red wavelength band light and the green wavelength band light having penetrated the condensing lens 149 are converted by 90° with respect to the optical axes thereof by the second dichroic mirror 148 toward the backside panel 13 and are guided to the condensing lens 173.

In the meantime, a first reflection mirror 143 configured to reflect the blue wavelength band light and to convert the optical axis thereof by 90° toward the left panel 15 is disposed between the condensing lens 115 and the front panel 12 on the optical axis of the blue wavelength band light having penetrated or diffusion-penetrated the fluorescent wheel 101. A condensing lens 146 is disposed at a side of the first reflection mirror 143 facing the left panel 15. A second reflection mirror 145 is disposed at a side of the condensing lens 146 facing the left panel 15. Also, a condensing lens 147 is disposed at a side of the second reflection mirror 145 facing the backside panel 13. The second reflection mirror 145 is configured to convert the optical axis of the blue wavelength band light, which is to be incident through the condensing lens 146 after reflected by the first reflection mirror 143, by 90° toward the backside panel 13. The blue wavelength band light reflected on the second reflection mirror is condensed at the condensing lens 147. The blue wavelength band light having penetrated the condensing lens 147 penetrates the second dichroic mirror 148 and is then guided to the condensing lens 173.

The light source-side optical system 170 has a condensing lens 173, a light tunnel 175, a condensing lens 178, an optical axis conversion mirror 181, a condensing lens 183, an illumination mirror 185, and a capacitor lens 195. In the meantime, the capacitor lens 195 is configured as a part of the projection-side optical system 220 because the capacitor lens 195 is configured to emit image light, which is to be emitted from the display element 51 disposed at a side of the capacitor lens 195 facing the backside panel 13, toward the projection-side optical system 220.

The condensing lens 173 is a lens configured to condense the emission lights from the light source device 60, and is disposed near the incidence port of the light tunnel 175. The respective color wavelength band lights are condensed by the condensing lens 173 and are then emitted toward the light tunnel 175.

The condensing lens 178 and the optical axis conversion mirror 181 are disposed on an optical axis of the light tunnel 175 facing the backside panel 13. The beam flux emitted from an emission port of the light tunnel 175 is condensed at the condensing lens 178, is reflected by the optical axis conversion mirror 181 and is then directed toward the left panel 15.

The beam flux reflected on the optical axis conversion mirror 181 is condensed by the condensing lens 183 and is then illuminated to the display element 51, which is configured to generate the image light, at a predetermined angle through the capacitor lens 195 by the illumination mirror 185. In the meantime, the display element 51 becoming a DMD is cooled by a heat sink 190 provided at the backside panel 13-side.

The projection-side optical system 220 is configured by a capacitor lens 195, a moveable lens group 235 and a fixed lens group 225. The beam flux illuminated onto an image formation surface of the display element 51 by the light source-side optical system 170 is reflected on the image formation surface of the display element 51 and is then projected onto the screen through the projection-side optical system 220, as projection light. The moveable lens group 235 is configured to be moveable by a lens motor. The moveable lens group 235 and the fixed lens group 225 are embedded in a fixed lens tube. Therefore, the fixed lens tube having the moveable lens group 235 becomes a moveable focus-type lens, so that it is formed to make it possible to adjust a zoom and a focus.

The projection device 10 is configured as described above, so that when the fluorescent wheel 101 is rotated and the lights are emitted from the excitation light illumination device 70 and the red light source device 120 at any timing, the red, green and blue lights of the respective wavelength bands are incident on the light source-side optical system 170 through the light guide optical system 140 and are then incident on the display element 51. For this reason, the display element 51 of the projection device 10 can project a color image on the screen by controlling the lights of the respective colors in a time division manner in accordance with the data.

In the first exemplary embodiment, the blue wavelength band lights of one set emitted from the light source units 74, 75 and being incident from the different directions are made to pass by the half mirrors 761, so that the lights are divided into the blue wavelength band lights of which the intensity is a half of the original intensity and the number is doubled. Also, the optical axes of the divided emission lights from the respective light source units 74, 75 are matched in correspondence to each other. Therefore, even when some of the blue laser diodes 711, 712 are not turned on due to a failure or the like, it is possible to considerably reduce an influence thereof on the uniformity of the intensity distribution of the beam flux section to be emitted from the excitation light illumination device 70.

Second Exemplary Embodiment

Figure 6:
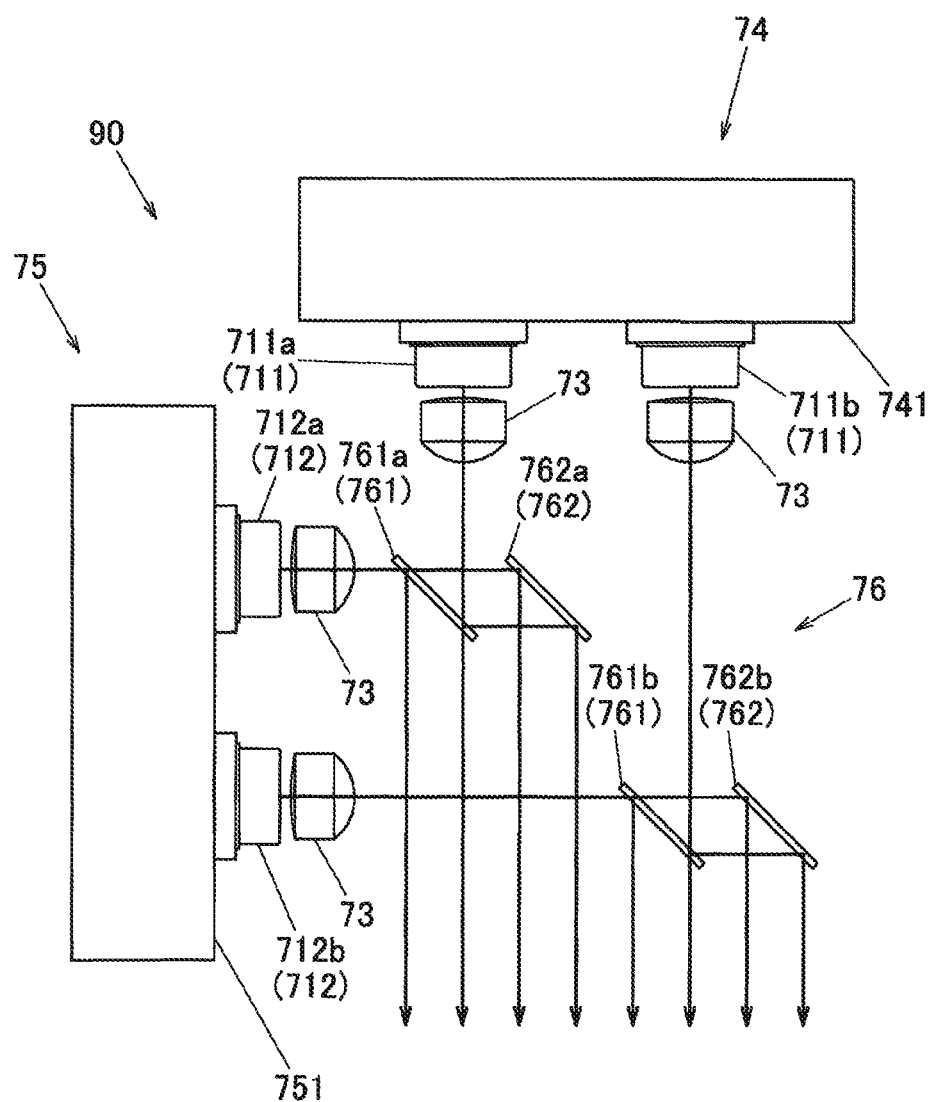
FIG. 6 is a plan view depicting a configuration of an excitation light illumination device in accordance with a second exemplary embodiment of the invention.
Figure 7:
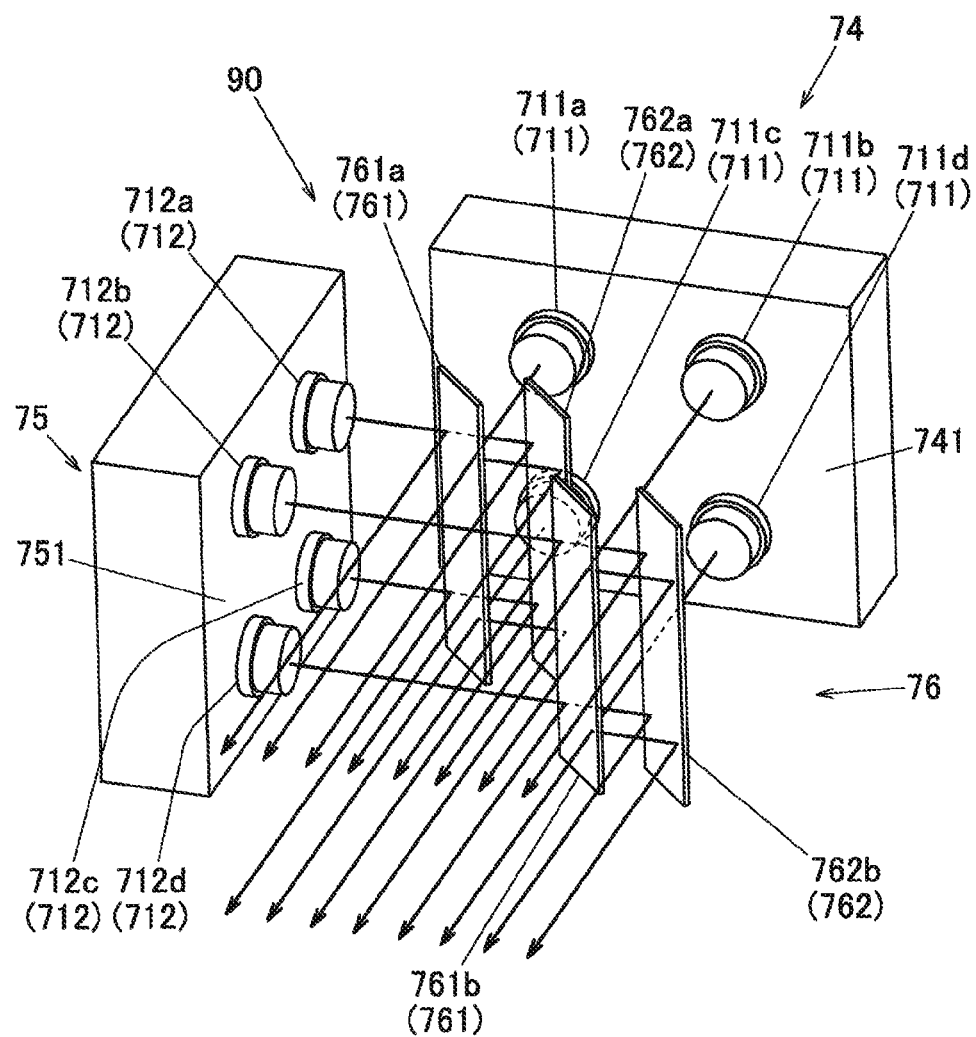
FIG. 7 is a perspective view depicting the configuration of the excitation light illumination device in accordance with the second exemplary embodiment of the invention.

Subsequently, a second exemplary embodiment of the invention is described. FIG. 6 is a plan view depicting a configuration of an excitation light illumination device 90 of the second exemplary embodiment. Also, FIG. 7 is a perspective view depicting the configuration of the excitation light illumination device 90. In the second exemplary embodiment, the projection device 10 has the excitation light illumination device 90, instead of the excitation light illumination device 70 of the first exemplary embodiment. In the meantime, the same configurations as the first exemplary embodiment are denoted with the same reference numerals and the descriptions thereof are omitted or simplified.

In the second exemplary embodiment, the excitation light illumination device 90 is configured so that the positions of the first light source unit 74, the second light source unit 75, the half mirror 761 and the total reflection mirror 762 are relatively shifted, as compared to the excitation light illumination device 70 of the first exemplary embodiment. As a result, the number of the beams of the blue wavelength band lights to be emitted as the emission lights of the excitation light illumination device 90 becomes greater than the number of the beams of the blue wavelength band lights emitted from the first blue laser diodes 711 and the second blue laser diodes 712. The half mirror 761 and the total reflection mirror 762 have the strip shape, like the first exemplary embodiment. Also, in the plan view of FIG. 6 as seen from the longitudinal direction of the half mirror 761, the half mirror 761 and the total reflection mirror 762 correspond to one combination of the first blue laser diodes 711 and the second blue laser diodes 712.

The half mirror 761 and the total reflection mirror 762 are disposed so that the incident angles of the blue wavelength band lights incident from the first blue laser diode 711 and the second blue laser diode 712 are 45°. Also, in the first exemplary embodiment, the blue wavelength band light emitted from the first blue laser diode 711 and the blue wavelength band light emitted from the second blue laser diode 712 of the lights incident on the half mirror 761 intersect at an angle of 90° at a position different from the position of the half mirror 761. As shown in the plan view of FIG. 6, the half mirror 761 is disposed so that the blue wavelength band light emitted from the first blue laser diode 711 and the blue wavelength band light emitted from the second blue laser diode 712 are incident on both end portions of the half mirror 761 with the optical axes of the respective blue wavelength band lights being slightly shifted. Also, the total reflection mirror 762 is disposed so that the blue wavelength band lights having penetrated or reflected on the half mirror 761 are respectively incident.

Subsequently, the light path of the emission light is described. The blue wavelength band lights emitted from the first blue laser diodes 711*a*, 711*c* penetrate by half the half mirror 761*a*, which are then emitted toward the direction of the fluorescent wheel 101, and the remaining halves are reflected toward the total reflection mirror 762*a*. The blue wavelength band light reflected on the half mirror 761*a* is then reflected on the total reflection mirror 762*a* and is then emitted toward the direction of the fluorescent wheel 101.

The blue wavelength band lights emitted from the second blue laser diodes 712*a*, 712*c* are reflected by half toward the direction of the fluorescent wheel 101 by the half mirror 761*a*, and the remaining halves penetrate the half mirror 761*a* and are then emitted toward the total reflection mirror 762*a*. The blue wavelength band lights having penetrated the half mirror 761*a* are then reflected on the total reflection mirror 762*a* and are emitted toward the direction of the fluorescent wheel 101.

Likewise, the blue wavelength band lights emitted from the first blue laser diodes 711*b*, 711*d* penetrate by half the half mirror 761*b*, which are then emitted toward the direction of the fluorescent wheel 101, and the remaining halves are reflected toward the total reflection mirror 762*b*. The blue wavelength band lights reflected on the half mirror 761*b* are then reflected on the total reflection mirror 762*b* and are emitted toward the direction of the fluorescent wheel 101.

The blue wavelength band lights emitted from the second blue laser diodes 712*b*, 712*d* are reflected by half toward the direction of the fluorescent wheel 101 by the half mirror 761*b*, and the remaining halves penetrate the half mirror 761*b* and are then emitted toward the total reflection mirror 762*b*. The blue wavelength band lights having penetrated the half mirror 761*b* are then reflected on the total reflection mirror 762*b* and are emitted toward the direction of the fluorescent wheel 101.

In this way, the blue wavelength band lights emitted from the first blue laser diode 711*a* and the second blue laser diode 712*a* of one set are incident on different positions shifted in a width direction of the half mirror 761. Also, the blue wavelength band lights emitted from the first blue laser diodes 711*a* to 711*d* and the second blue laser diodes 712*a* to 712*d* are emitted from the excitation light illumination device 90 with the half amount of light and with the number of the beams being doubled.

In the second exemplary embodiment, as shown in FIGS. 6 and 7, the four blue wavelength band lights emitted from the first blue laser diodes 711 and the four blue wavelength band lights emitted from the second blue laser diodes 712 are split to eight blue wavelength band lights of which a light intensity is a half of the original intensity, respectively. The eight split blue wavelength band lights emitted from the first blue laser diodes 711 and the eight split blue wavelength band lights emitted from the second blue laser diodes 712 become the beams having different optical axes. For this reason, as the blue wavelength band lights emitted from the excitation light illumination device 90, a total of sixteen blue wavelength band lights are finally emitted in the same direction toward the fluorescent wheel 101. Like this, since the split blue wavelength band lights are dispersedly disposed at the spaced positions in the beam flux, it is possible to efficiently make the uniform beam flux for the lights condensed by the condensing lens 78 and the like.

In the excitation light illumination device 90 of the second exemplary embodiment, the positions of the first light source unit 74, the second light source unit 75, the half mirror 761 and the total reflection mirror 762 are relatively shifted, as compared to the excitation light illumination device 70 of the first exemplary embodiment. Therefore, the illumination position of the first blue laser diode 711 and the illumination position of the second blue laser diode 712 are different in the horizontal direction of the half mirror 761. However, the invention is not limited to the arrangement. For example, the illumination position of the first blue laser diode 711 and the illumination position of the second blue laser diode 712 may be different from each other in the vertical direction of the half mirror 761, i.e., in the longitudinal direction of the half mirror 761 having the strip shape. By this configuration, it is possible to increase the number of the beams of the blue wavelength band lights to be emitted as the emission lights of the excitation light illumination device 90, as compared to the number of the beams of the blue wavelength band lights emitted from the first blue laser diodes 711 and the second blue laser diodes 712.

Figure 8:
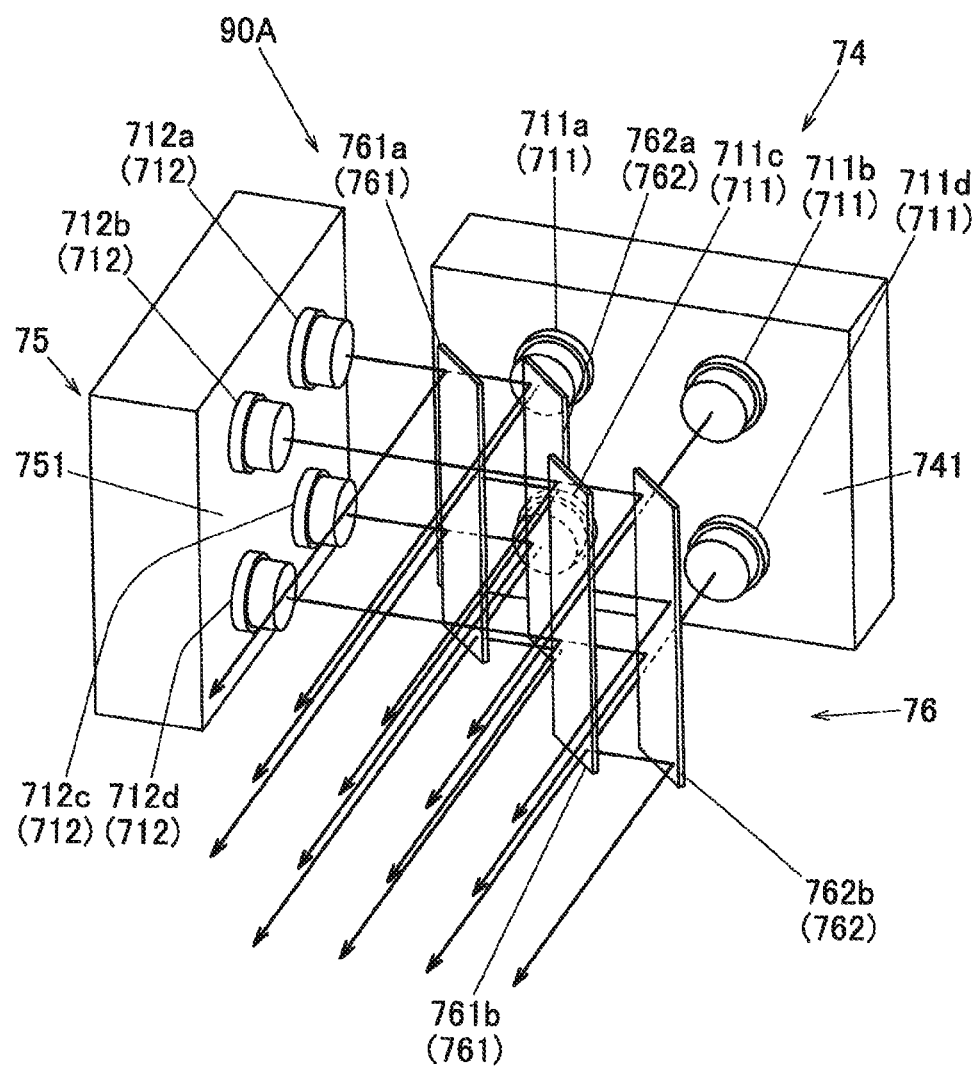
FIG. 8 is a perspective view depicting a configuration of a modified embodiment of the excitation light illumination device in accordance with the second exemplary embodiment of the invention.

Subsequently, a modified embodiment of the second exemplary embodiment is described. FIG. 8 is a perspective view depicting a configuration of an excitation light illumination device 90A of a modified embodiment. In the excitation light illumination device 90A, the second light source unit 75 may be disposed at a position shifted upward. That is, the second light source unit 75 is disposed with being more vertically shifted than the first light source unit 75 of the excitation light illumination device 90 with respect to the incident direction (first direction) of the blue wavelength band light emitted from the first blue laser diode 711 and the incident direction (second direction) of the blue wavelength band light emitted from the second blue laser diode 712. Therefore, a plan view corresponding to the excitation light illumination device 90A shown in FIG. 8 is the same as FIG. 6. The blue wavelength band lights emitted from the first blue laser diode 711 and the second blue laser diode 712 are incident on different positions shifted in the longitudinal and width directions of the half mirror 761. By this configuration, the blue wavelength band lights emitted from the first blue laser diodes 711a to 711d and the second blue laser diodes 712a to 712d can be emitted from the excitation light illumination device 90A, as a plurality of beams of which the number of the beams having a half amount of light is doubled and which is shifted in the upper-lower and left-right directions. Meanwhile, the modified embodiment is not limited to the configuration where the second light source unit 75 is disposed with being shifted upward, as shown in FIG. 8. For example, a configuration where the position of the second light source unit 75 is the same as FIG. 7 and the relative positions of the respective second blue laser diodes 712 are shifted upward with respect to the first blue laser diodes 711 is also possible.

In the second exemplary embodiment, the blue wavelength band lights of one set emitted from the light source units 74, 75 and being incident from the different directions are made to pass by the half mirror 761, so that the lights are split into the blue wavelength band lights of which the intensity is a half of the original intensity and the number thereof is doubled. Also, the optical axes of the emission lights after the splitting of the beams by the half mirrors 761a, 761b of the respective light source units 74, 75 are different. Thereby, even when some of the first blue laser diodes 711 and the second blue laser diodes 712 are not turned on due to a failure or the like, it is possible to remarkably reduce an influence thereof on the uniformity of the intensity distribution of the beam flux section to be emitted from the excitation light illumination devices 90, 90A because the beams emitted from the respective blue laser diodes 711, 712 have been split.

Although the respective exemplary embodiments of the invention have been described, as the emission lights of which the number of beams is increased by the half mirrors 761 and the total reflection mirrors 762 having the strip shape, the green wavelength band light or the red wavelength band light can also be used, in addition to the blue wavelength band light. In this case, the light source device 60 may have a green light source device having a green laser diode configured to emit the green wavelength band light without the fluorescent wheel device 100. Also, likewise, the light source device 60 may have a red light source device having a red laser diode configured to emit the red wavelength band light. Also in any light source, since the beam emitted from one light source is split in the beam flux, it is possible to make the light having a more uniform intensity distribution even though the non-uniformity occurs in the light emission intensity of each light source element due to an individual difference including a manufacturing error and the like. Also, even when a light emission failure occurs in some light source elements, the other light source elements of the same system also do not emit the lights, so that the intensity distribution is lowered as a whole. Therefore, it is possible to make a deviation of the uniformity of the intensity distribution of the beam flux minor.

Also, in the above exemplary embodiments, the respective blue wavelength band lights emitted from the respective blue laser diodes 711, 712 are made to be incident on any one half mirror 761 one time, and the respective blue wavelength band lights are then emitted as the emission lights of the same direction. However, the blue wavelength band lights may be made to be incident on the plurality of the half mirrors more than once and may be then reflected by the total reflection mirrors appropriately disposed, and all the emission lights may be emitted in the same direction. For example, when the blue wavelength band lights are made to be incident on the half mirrors two times, the final emission lights can be made as the lights having a quarter intensity of the original intensity and having the four times of the number of beams, so that it is possible to make a beam flux having a more uniform intensity distribution.

Also, one or more light splitting mirrors configured to reflect a half or more of light to be incident and to enable the remaining light to penetrate therethrough or to enable a half or more of light to be incident to penetrate therethrough and to reflect the remaining light may be disposed instead of the half mirrors 761 of the above exemplary embodiments or together with the half mirrors 761.

Also, in the above exemplary embodiments, the first light source unit 74 and the second light source unit 75 are disposed so that the arrangement surfaces 741, 751 are perpendicular to each other. However, the arrangement surfaces 741, 751 of the first light source unit 74 and the second light source unit 75 may be arranged side by side on the same plane. In this case, members such as other total reflection mirrors configured to guide the blue wavelength band lights emitted from one side of the blue laser diodes 711, 712 may be appropriately disposed so that the incident direction of the blue wavelength band light from the first blue laser diode 711 and the incident direction of the blue wavelength band light from the second blue laser diode 712 are perpendicular to each other on the half mirror 761. Also, upon the incidence on the half mirror 761, if the blue wavelength band lights emitted from the first blue laser diode 711 and the second blue laser diode 712 are incident in the orthogonal directions, the other appropriate configurations may be adopted with respect to the arrangement positions and directions of the first light source unit 74 and the second light source unit 75.

Also, in the above exemplary embodiments, the blue wavelength band lights from the first blue laser diode 711 and the second blue laser diode 712 are made to be incident on the half mirror 761 at 45°, respectively. However, the blue wavelength band lights may be made to be incident at an acuter angle or an obtuser angle. In this case, appropriate members such as total reflection mirrors configured to guide the respective blue wavelength band lights having penetrated and reflected on the half mirror 761 so that the lights are the same direction, as the emission lights of the excitation light illumination devices 70, 90, may be provided at a rear end.

Also, in the above exemplary embodiments, in the plan views of FIGS. 4 and 6, the combination of the first blue laser diode 711 and the second blue laser diode 712 is two combinations. However, more combinations can also be adopted. Also, the appropriate number of the light source units 74, 75, for example, three or more light source units may be provided.

Also, in the above exemplary embodiments, regarding the control by the excitation light illumination devices 70, 90, 90A, the unit of the first blue laser diode 711 and the second blue laser diode 712 of one group is set for each first light source unit 74 and each second light source unit 75. However, the unit of the first blue laser diode 711 and the second blue laser diode 712 of one group may be set to a plurality of first blue laser diodes 711 or second blue laser diodes 712 connected in series. Alternatively, the unit of the first blue laser diode 711 and the second blue laser diode 712 of one group may be set to the first blue laser diodes 711 and the second blue laser diodes 712, which are connected in series or in parallel and of which light emission is controlled on the basis of the same control signal. In addition, the unit of the first blue laser diode 711 and the second blue laser diode 712 of one group may be set to the first blue laser diodes 711 and the second blue laser diodes 712 of each row or each column in the first light source unit 74 and in the second light source unit 75, or may be set to the first blue laser diodes 711 and the second blue laser diodes 712 classified into two systems in a check pattern shape in each of the first light source unit 74 and the second light source unit 75. That is, the unit of the first blue laser diode 711 and the second blue laser diode 712 of one group may be set to a combination in which the light intensity distribution in the beam flux of the blue wavelength band lights emitted by the first blue laser diodes 711 and the second blue laser diodes 712 of each group is uniform.

As described above, the light source device 60 including the light splitting mirrors 761, which are provided in correspondence to the first solid-state light emitting elements 711 and are configured to split the first beam incident from the first direction by penetration and reflection, and the reflection mirrors 762, which are provided in correspondence to the light splitting mirrors 761 and are configured to reflect one first beam split at the light splitting mirrors 761 in the same direction as the other first beam split at the light splitting mirrors 761, can arrange more beams than the number of the light emitting elements at dispersed positions in the beam flux section. Therefore, it is possible to provide the light source device 60, which can emit the lights having the uniform intensity distribution even when any one light emitting element is deteriorated or turned off, and the projection device 10 using the light source device 60. For this reason, it is possible to prevent an image from being extremely non-uniform as a whole.

Also, the light source device 60 including the light splitting mirrors 761, which are provided in correspondence to the combinations of the first solid-state light emitting elements 711 and the second solid-state light emitting elements 712 and are configured to split the second beam incident from the second direction different from the first direction by penetration and reflection, and the reflection mirrors 762, which are provided in correspondence to the light splitting mirrors 761 and are configured to reflect one second beam split at the light splitting mirrors 761 in the same direction as the other second beam split at the light splitting mirrors 761, can arrange more beams than the number of the light emitting elements at dispersed positions in the beam flux section with the first beam and the second beam overlapping with or deviating from each other. For this reason, it is possible to uniformize the light intensity distribution in the beam flux emitted from the light source device 60.

Also, the light source device 60, in which the light splitting mirror 761 corresponding to the combination of the first solid-state light emitting element 711 and the second solid-state light emitting element 712 is one and the light splitting mirror 761 is configured to enable the halves of the first incident beam and the incident second beam to penetrate therethrough and to reflect the remaining halves, doubles the number of beams emitted from the first solid-state light emitting element 711 and the second solid-state light emitting elements 712 and reduces the intensity of each beam by half. For this reason, it is possible to make the light intensity distribution in the beam flux, which is to be emitted from the entire light source device 60, more uniform.

Also, the light source device 60, in which the first direction and the second direction are perpendicular to each other and the first beam and the second beam to be incident on the light splitting mirror and the reflection mirror are incident on the light splitting mirror 761 and the reflection mirror 762 at the incident angle of 45°, can make the reflection direction of one split beam and the penetration direction of the other split beam of the first beam and the second beam be the same direction. For this reason, it is possible to configure the mirror group 76 with a simple configuration.

Also, the light source device 60, in which the first beam and the second beam incident on the light splitting mirror 761 intersect at the position of the light splitting mirror 761, can match the optical axis of the first split beam and the optical axis of the second split beam. For this reason, one beam emitted from the light source device 60 is configured by beams emitted from a plurality of light sources, so that even when one solid-state light emitting element is turned off, it is possible to maintain the uniform intensity distribution as the beam flux of the light source device 60.

Also, the light source device 60, in which the first beam and the second beam incident on the light splitting mirror are incident at different positions on the light splitting mirror 761, can make the first split beam and second split beam as beams having different optical axes. For this reason, it is possible to uniformize the intensity distribution of the beam flux of the light source device 60 by increasing the number of beams to be emitted from the light source device 60 beyond the number of the light sources.

Also, in the light source device 60 including the first light source unit 74, which is configured to control the light emission of the plurality of the first solid-state light emitting elements 711 by the same system, and the second light source unit 75, which is configured to control the light emission of the plurality of the second solid-state light emitting elements 712 by the same system, when any one of the solid-state light emitting elements is incapable of lighting, the other solid-state light emitting elements of the same system as the solid-state light emitting element incapable of lighting are also incapable of lighting. For this reason, it is possible to reduce a deviation of the intensity distribution of the emission lights, which is caused as some solid-state light emitting elements are incapable of lighting.

Also, the light source device 60, in which the first light source unit 74 and the second light source unit 75 have the heat sinks 81a, 81b configured to cool the respective first solid-state light emitting elements 711 and second solid-state light emitting elements 712, can perform the appropriate cooling corresponding to the using time, heat generation states and the like of the solid-state light emitting elements 711, 712 for each of the light source units 74, 75.

Also, the light source device, in which the first solid-state light emitting element 711 and the second solid-state light emitting element 712 are configured to emit any one of the blue wavelength band light, the green wavelength band light and the red wavelength band light as the first beam and the second beam, can emit any one of the blue wavelength band light, the green wavelength band light and the red wavelength band light, which are to be emitted, as a beam flux having a uniform intensity distribution.

Meanwhile, in the above exemplary embodiments, the blue light emitted from one blue laser diode is bisected into the blue light (about ½) penetrating the half mirror (light splitting mirror) and the blue light (about ½) to be reflected on the half mirror. Then, the blue light (about ½) having penetrated the half mirror (light splitting mirror) is totally reflected by the total reflection mirror. However, the invention is not limited thereto.

For example, the light that is to be totally reflected by the total reflection mirror, may be totally reflected by the total reflection mirror after penetrating the half mirror (light splitting mirror) one time or two times. In this case, the blue light emitted from one blue laser diode is split into blue light (about ⅓), which is to be reflected on the first half mirror (light splitting mirror), and blue light (about ⅔), which is to penetrate the first half mirror (light splitting mirror), and the blue light (about ⅔) having penetrated the first half mirror (light splitting mirror) is bisected at the second half mirror (light splitting mirror). That is, the blue light is split into the blue light [about ⅓ of the original light (½ of about ⅔)], which is to be reflected on the second half mirror (light splitting mirror), and the blue light [about ⅓ of the original light (½ of about ⅔)], which is to penetrate the second half mirror (light splitting mirror), and the blue light (about ⅓ of the original light) having finally penetrated the half mirror (light splitting mirror) is totally reflected by the total reflection mirror.

In the meantime, the lights, which are to be emitted from the first blue laser diodes (first solid-state light emitting elements) 711 of the first light source unit 74 and the second blue laser diodes (second solid-state light emitting elements) 712 of the second light source unit 75, may not be the same wavelength band lights. For example, the light to be emitted from the first blue laser diode (first solid-state light emitting element) and the light to be emitted from the second blue laser diode (second solid-state light emitting element) are all the blue wavelength band lights but the wavelength of the emission light of the other solid-state light emitting element may be shifted toward the short wavelength-side with respect to the emission light of one solid-state light emitting element. Likewise, the light may be in a different wavelength band within the green wavelength band or in a different wavelength band within the red wavelength band.

Also, the light to be emitted from the first solid-state light emitting element and the light to be emitted from the second solid-state light emitting element may be wavelength band lights of different colors. That is, a variety of combinations such as a combination where one is the blue wavelength band light and the other is the green wavelength band light, a combination where one is the blue wavelength band light and the other is the red wavelength band light, a combination where one is the green wavelength band light and the other is the red wavelength band light, and the like are considered, and any combination may be used. Also, the light to be emitted from the first solid-state light emitting element and the light to be emitted from the second solid-state light emitting element may be lights (P polarization light and S polarization light) having different polarization directions.

Figure 9:
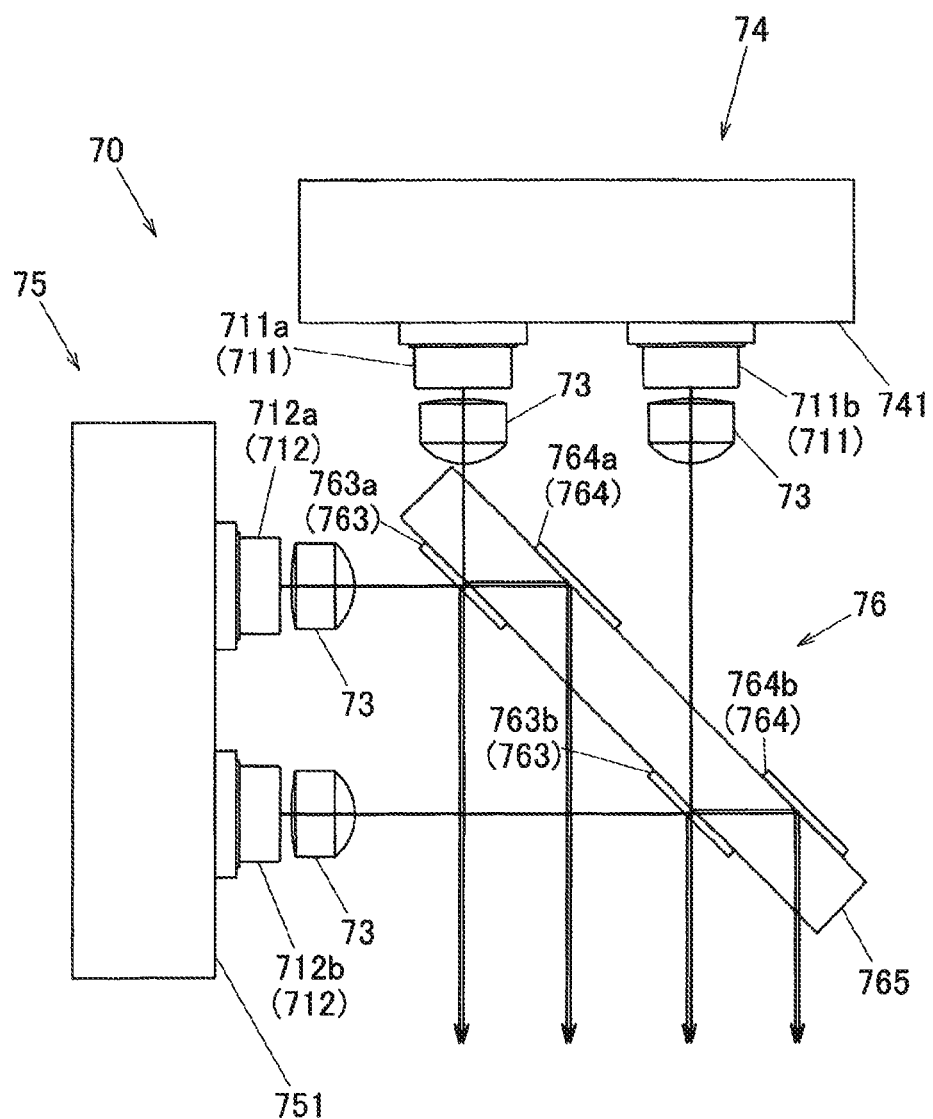
FIG. 9 is a plan view depicting a configuration of an excitation light illumination device in accordance with the exemplary embodiment of the invention.

Also, instead of the configuration where the plurality of the half mirrors 761 and the plurality of the total reflection mirrors 762 are individually provided, respectively, one translucent member 765 such as a glass plate configured to enable visible light to penetrate therethrough may be prepared, and a half mirror film 763 may be formed on one surface of the translucent member 765 and a total reflection mirror film 764 may be formed on the other surface, as shown in FIG. 9. The films 763, 764 are preferably formed at positions of the translucent member 765 to which the lights from the respective solid-state light emitting elements 711, 712 are to be illuminated. Therefore, the films 763, 764 are formed at respective places that are to be illuminated from the solid-state light emitting elements 711, 712. The first beam and the second beam are first illuminated to the light splitting mirror (the half mirror film 763). In the meantime, the configuration of FIG. 9 may be applied to the first exemplary embodiment or the second exemplary embodiment.

The above exemplary embodiments are just exemplary and are not construed to limit the scope of the invention. The above novel exemplary embodiments can be implemented in other forms and can be diversely omitted, replaced and changed without departing from the gist of the invention. The above exemplary embodiments and modifications thereof are included in the scope and gist of the invention and are also included in the inventions defined in the claims and the equivalents thereto.

What is claimed is:

1. A light source device comprising:
a plurality of first solid-state light emitting elements configured to emit first beams;
a light splitting mirror provided in correspondence to the first solid-state light emitting elements and configured to split the first beams, which are incident from a first direction, by penetration and reflection;
a reflection mirror provided in correspondence to the light splitting mirror and configured to reflect one first beams split at the light splitting mirror in the same direction as the other first beams split at the light splitting mirror; and
a plurality of second solid-state light emitting elements configured to emit second beams,
wherein the light splitting mirror is provided in correspondence to a combination of the first solid-state light emitting elements and the second solid-state light emitting elements, and is configured to split the second beams, which are incident from a second direction different from the first direction, by penetration and reflection, and
wherein the reflection mirror is provided in correspondence to the light splitting mirror and is configured to reflect one second beams split at the light splitting mirror in the same direction as the other second beams split at the light splitting mirror.

2. The light source device according to claim 1,
wherein the light splitting mirror is configured to enable about halves of the first beam and the second beam to penetrate therethrough and to reflect the remaining halves.

3. The light source device according to claim 2,
wherein the first direction and the second direction are substantially perpendicular to each other, and
wherein the first beams and the second beams are incident on the light splitting mirror and the reflection mirror at an incident angle of about 45°.

4. The light source device according to claim 3,
wherein the first beams and the second beams, which are incident on the light splitting mirror, are to intersect at a position of the light splitting mirror.

5. The light source device according to claim 3,
wherein the first beams and the second beams are incident at different positions on the light splitting mirror.

6. The light source device according to claim 2,
wherein the first beams and the second beams, which are incident on the light splitting mirror, are to intersect at a position of the light splitting mirror.

7. The light source device according to claim 2,
wherein the first beams and the second beams are incident at different positions on the light splitting mirror.

8. The light source device according to claim 2, further comprising:
a first light source unit configured to control light emissions of the plurality of the first solid-state light emitting elements by the same system; and
a second light source unit configured to control light emissions of the plurality of the second solid-state light emitting elements by the same system.

9. The light source device according to claim 1,
wherein the first direction and the second direction are substantially perpendicular to each other, and
wherein the first beams and the second beams are incident on the light splitting mirror and the reflection mirror at an incident angle of about 45°.

10. The light source device according to claim 9,
wherein the first beams and the second beams, which are incident on the light splitting mirror, are to intersect at a position of the light splitting mirror.

11. The light source device according to claim 9,
wherein the first beams and the second beams are incident at different positions on the light splitting mirror.

12. The light source device according to claim 1,
wherein the first beams and the second beams, which are incident on the light splitting mirror, are to intersect at a position of the light splitting mirror.

13. The light source device according to claim 1,
wherein the first beams and the second beams are incident at different positions on the light splitting mirror.

14. The light source device according to claim 1, further comprising:
a first light source unit configured to control light emissions of the plurality of the first solid-state light emitting elements by the same system; and
a second light source unit configured to control light emissions of the plurality of the second solid-state light emitting elements by the same system.

15. The light source device according to claim 14,
wherein the first light source unit and the second light source unit comprise heat sinks configured to cool the first solid-state light emitting elements and the second solid-state light emitting elements, respectively.

16. The light source device according to claim 1,
wherein the first solid-state light emitting elements and the second solid-state light emitting elements are configured to emit any one of blue wavelength band light, green wavelength band light and red wavelength band light, as the first beams and the second beams.

17. The light source device according to claim 1,
wherein the first beams and the second beams are lights of different wavelength bands.

18. The light source device according to claim 1, further comprising:
a translucent member configured to enable visible light to penetrate therethrough,
wherein the light splitting mirror and the reflection mirror have a film shape,
wherein the light splitting mirror is formed on one surface of the translucent member and the reflection mirror is formed on the other surface of the translucent member, and
wherein the first beams and the second beams are illuminated to the light splitting mirror.

19. A projection device comprising:
the light source device according to claim 1;
a display element configured to generate image light;
a projection-side optical system configured to project the image light emitted from the display element onto a screen; and
a projection device control unit configured to control the light source device and the display element.

* * * * *